(12) United States Patent
Friskney et al.

(10) Patent No.: US 7,471,903 B1
(45) Date of Patent: Dec. 30, 2008

(54) OPTICAL COMMUNICATION SYSTEM

(75) Inventors: Robert Friskney, Harlow (GB); Adrian Sparks, Ongar (GB); Robert Spagnoletti, Hertford (GB); Robin Rickard, Spellbrook (GB)

(73) Assignee: Nortel Networks Limited, St. Laurent, Quebec (CA)

( * ) Notice: Subject to any disclaimer, the term of this patent is extended or adjusted under 35 U.S.C. 154(b) by 1106 days.

(21) Appl. No.: 10/180,595

(22) Filed: Jun. 26, 2002

(51) Int. Cl.
*H04B 10/04* (2006.01)

(52) U.S. Cl. .................. 398/185; 398/194; 398/198

(58) Field of Classification Search .............. 398/183, 398/184, 185, 186, 187, 188, 189, 190, 191, 398/192, 194, 195, 198
See application file for complete search history.

(56) References Cited

U.S. PATENT DOCUMENTS

| | | | |
|---|---|---|---|
| 5,541,955 A * | 7/1996 | Jacobsmeyer | 375/222 |
| 5,706,313 A | 1/1998 | Blasiak | 375/330 |
| 5,822,102 A * | 10/1998 | Bodeep et al. | 398/69 |
| 6,088,327 A | 7/2000 | Muschallik | 370/210 |
| 6,124,960 A * | 9/2000 | Garthe et al. | 398/194 |
| 6,341,023 B1 * | 1/2002 | Puc | 398/79 |
| 6,525,857 B1 * | 2/2003 | Way et al. | 398/192 |
| 6,580,536 B1 * | 6/2003 | Chraplyvy et al. | 398/79 |
| 6,879,640 B1 * | 4/2005 | Agazzi | 375/295 |
| 7,035,285 B2 * | 4/2006 | Holloway et al. | 370/474 |
| 2002/0163705 A1 * | 11/2002 | Bakker et al. | 359/239 |
| 2002/0167693 A1 * | 11/2002 | Vrazel et al. | 359/109 |

* cited by examiner

*Primary Examiner*—Christina Y Leung
(74) *Attorney, Agent, or Firm*—Barnes & Thornburg LLP

(57) ABSTRACT

An optical communications system has a transmitter which uses modulation using multiple level phase and/or amplitude modulation, and is adaptable to provide modulation for different signals using different selections of the multiple levels. A receiver is able to perform demodulation from the multiple level phase and/or amplitude modulation, and is adaptable to provide demodulation of signals modulated using the different selections of the multiple levels. This provides an adaptive modulation system, so that different bit rates can be employed for different links.

30 Claims, 2 Drawing Sheets

OPTICAL COMMUNICATION SYSTEM

FIELD OF THE INVENTION

This invention relates to optical communications systems, and in particular systems using wavelength division multiplexed channels in which specific carrier frequencies are allocated to different communication channels.

BACKGROUND OF THE INVENTION

In modern dense wavelength division multiplex (DWDM) systems, multiple carrier wavelengths to be transported on a common fiber are spaced apart by a fixed and standardized distance within the frequency spectrum. This approach is useful for network planning and management and for inter-operation of equipment. However, the wavelength spacing is not exactly tuned to the needs of the transmission of each of the wavelengths, thus not making full use of the capacity of the fiber for data transmission.

For example, the transmission characteristics are different between different wavelengths, and different channel wavelengths from a source node may be for transmission to different destinations with different reach. For example, some wavelengths may be for transmission to a remote node at the end of the transmission fiber, whereas other wavelengths may be dropped at intermediate nodes or OADM (optical add/drop multiplex) sites.

The modulation of the data signal to be transmitted onto the carrier frequency allocated to a particular channel can be carried out in a number of ways. Typically, the modulation of digital signals onto a fixed frequency carrier will involve one or a combination of amplitude shift keying and phase shift keying. These modulation techniques provide modification to the amplitude or phase of the carrier to provide a representation of one or many digital 1s or 0s within each sample period.

Binary modulation techniques provide encoding of a single bit. However, multiple level modulation schemes are also possible, in which each encoding operation encodes a multiple bit word. In this case, the same signalling rate (i.e. number of modulated transmissions per second) results in a higher bit rate. This is, of course, at the expense of more complicated modulation and demodulation systems, and such modulation systems are inevitably more susceptible to noise and are therefore appropriate for shorter reach transmissions.

Typically, the modulation system employed is tailored to meet the most stringent requirements within the optical communications system. This inevitably results in some inefficiency.

It is apparent that different transmission systems could conceivably be used for different links within an optical network, so that the transmission is tailored to the specific requirement of the link. However, there is also the need to reduce inventory within the transmitters and receivers, and standardization of components is therefore clearly desirable.

SUMMARY OF THE INVENTION

According to a first aspect of the invention, there is provided an optical communications system comprising at least one transmitter site for transmitting optical signals and at least one receiver site for receiving optical signals from the transmitter site, wherein the transmitter site comprises a transmitter having a modulation system enabling modulation using multiple level phase and/or amplitude modulation, the transmitter being adaptable to provide modulation for different signals using different selections of the multiple levels, and wherein the receiver site comprises a receiver having a demodulation system enabling demodulation from the multiple level phase and/or amplitude modulation, and being adaptable to provide demodulation of signals modulated using the different selections of the multiple levels.

In this arrangement, an adaptive modulation system is provided, so that different bit rates can be employed for different links. Where the link will support a higher level modulation scheme, more (or all) of the multiple levels can be employed. This results in an increased bit rate, thereby obtaining high capacity from the channel bandwidth. This may be appropriate for short links.

For other links (for example longer links), where a lower level modulation scheme is required to maintain the desired error rate at the receiver, fewer of the multiple levels can be employed, for example a binary modulation scheme may be employed. However, this can be achieved with the same modulation/demodulation hardware. Furthermore, as the receiver has the hardware for the multiple level demodulation, additional information can nevertheless be obtained at the receiver.

The transmitter of the system can thus send signals to different receivers at different reach with different modulation schemes. Similarly, a receiver can receive signals from different transmitters at different reach which have been transmitted with different modulation schemes. Different modulation schemes may also be employed for different channels over the same link, where there are strong frequency-dependent effects which result in some channels being subjected to substantially different noise to others.

In this description and claims, the term "multi level" is intended to indicate that each transmission can encode a multi-bit symbol. For example, this may include multi level amplitude shift keying, multiple phase shift keying, or a scheme which combines phase and amplitude modulation, such as quadrature amplitude modulation (QAM), for example 16-QAM and higher orders of QAM. It is noted that 4-QAM may be considered as an example of multiple phase shift keying (as there is not necessarily any amplitude modulation).

Thus, the multiple level phase and/or amplitude modulation may comprise QAM, for example 16-point QAM. This enables the bit rate to be increased by a factor of four over binary modulation. The QAM then has a constellation pattern having a plurality of constellation points, and the transmitter is adaptable to modulate different signals using different numbers of the points of the constellation pattern. In this way, a binary modulation scheme can be implemented by modulating using only two of the constellation points. For example, the transmitter can operate in a first mode using 16-point QAM and in a second mode using binary (e.g. differential) phase shift keying using two of the QAM constellation points.

In this way, additional information can be gained from receiving with more constellation points than are transmitted on, for example by using maximum likelihood decoding.

The receiver of each receiver site may comprise demodulation hardware and a controller for controlling the hardware and operable using software, wherein the receiver of each receiver site has identical hardware which is controllable by software. The hardware inventory for each receiver can thus be standardized, with software control to implement the required demodulation.

Particularly when operating using not all constellation points, the transmitter can apply forward error correction coding.

Particularly where bit-rate related transmission difficulties dominate, sub-carrier modulation may be employed. This enables a given data rate transmission to be achieved using a number of more closely spaced but lower bit rate sub-channels. Sub-carrier modulation can be employed where, for a given bit rate and destination, the transmission impairments are too high. Sub-carrier modulation gives an approximation to the performance of the lower bit rate but with the data rate of the higher bit rate, at the expense of more complicated receivers and greater interference with neighboring channels. Sub-carrier modulation enables the information in a spectrum to be spread in a more flexible way. For this purpose, the transmitter may perform Fourier Transformations (or other signal processing techniques) for converting data into the frequency domain on multiple carriers for transmission. Each receiver then comprises a Fourier Transformation unit such that the receiver is capable of reconstructing data from multiple sub-carrier frequency carriers.

The transmitter may include a pre-distortion unit. This is particularly useful when power/frequency data is available as it is from the Fourier transform, so that pre-distortion can be applied to the power versus frequency characteristics of the signal to be transmitted. It is then possible to provide compensation for deterministic effects, such as cross phase modulation, four wave mixing and chromatic dispersion.

According to a second aspect of the invention, there is provided a receiver for use in an optical communications system, comprising a demodulation system enabling demodulation of a multiple level phase and/or amplitude modulated optical signal, wherein the receiver is operable in at least two modes, a first mode in which the received signals have been modulated using a first selection of the multiple levels, and a second mode in which the received signals have been modulated using a second, different, selection of the multiple levels.

This aspect provides a receiver that is configurable to receive differently modulated signals. When in the second mode, the received signals have been modulated using a lower number of the multiple levels than in the first mode, and additional demodulation information can then be derived from the unused levels. The receiver may comprise a Fourier Transformation unit such that the receiver is capable of reconstructing data from multiple sub-carrier frequency carriers. This can also be used for post-distortion compensation.

According to a third aspect of the invention, there is provided a transmitter for use in an optical communications system, comprising a modulation system enabling modulation using multiple level phase and/or amplitude modulation, the transmitter being adaptable to provide modulation for different signals using different selections of the multiple levels.

This aspect provides a transmitter for use in the system of the invention. Again, the multiple level phase and/or amplitude modulation preferably comprises QAM. The phase modulation may be based on differential phase modulation rather than absolute phase modulation. For example, the transmitter can be adaptable to operate at least in a first mode using 16-point QAM and a second mode using binary (e.g. differential) phase shift keying using two of the QAM constellation points.

According to a fourth aspect of the invention, there is provided a method of transmitting optical data from a transmitter site to at least two receiver sites, the method comprising:

controlling a modulation unit in the transmitter site to modulate a first signal carrier using multiple level phase and/or amplitude modulation using a first number of the levels and transmitting the modulated signal to one of the receiver sites; and controlling the modulation unit in the transmitter site to modulate a second signal carrier using multiple level phase and/or amplitude modulation using a second number of the levels, different to the first number of levels, and transmitting the modulated signal to the other of the receiver sites.

This method enables identical hardware to be controlled in different ways to enable a modulation scheme to be tailored to the characteristics of the optical link, so that a higher volume of data transmission is achieved from efficient use of the available channel bandwidth. The method may further comprise applying forward error correction coding and/or pre-distortion to one or both of the signals for the at least two receiver sites. The pre-distortion may modify the power versus frequency characteristics of the signal to be transmitted, for example to provide compensation for cross phase modulation, four wave mixing and/or chromatic dispersion.

According to a fifth aspect of the invention, there is provided a method of receiving optical signals comprising:

demodulating the received signal using multiple level phase and/or amplitude demodulation, wherein the demodulation is carried out using additional levels to those used in the modulation of the received signals;

using the additional levels as soft-decision threshold points to provide soft decision data; and applying a forward error correction algorithm using the soft decision data.

This aspect uses a demodulator with additional capability to that required for demodulation of a received signal, and uses this additional capability to provide error correction to improve the robustness of the transmission system.

The invention also provides a computer program product for configuring the operation of an optical transmitter and receiver to perform the functions outlined above.

According to a sixth aspect of the invention, there is provided a receiver for use in a communications system, wherein the receiver is for receiving multiple channels, wherein the receiver further comprises a processor for compensating for inter-channel effects using the received data from the multiple channels. This receiver can be used in an optical communications system for compensating for Four Wave Mixing, for example between sub-carrier channels.

According to a seventh aspect of the invention, there is provided a method of processing signals, comprising receiving multiple channels, the method further comprising processing the received channels to compensate for inter-channel effects.

According to a eighth aspect of the invention, there is provided a transmitter for use in a communications system, wherein the transmitter is for transmitting multiple channels, wherein the transmitter further comprises a processor for pre-compensating for inter-channel effects using data to be transmitted for the multiple channels.

According to a ninth aspect of the invention, there is provided a method of transmitting signals on multiple frequencies, comprising pre-processing the signals to compensate for inter-channel effects before transmission.

BRIEF DESCRIPTION OF THE DRAWINGS

Examples of the invention will now be described in detail with reference to the accompanying drawings, in which.

DETAILED DESCRIPTION

Figure 1:
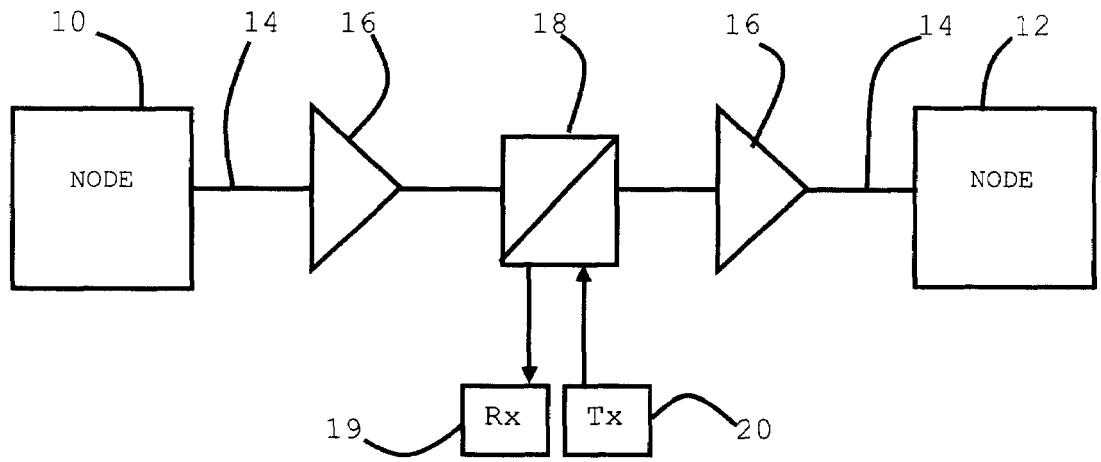
FIG. 1 shows an example of a portion of a known optical network for explaining the principles behind the invention.

FIG. 1 shows a simplified optical communications network comprising first and second optical nodes 10, 12. Data is transmitted between the nodes 10, 12 as a WDM optical signal on optical fiber carriers 14. Each node includes transmitters and receivers and typically services a local area.

The optical signals undergo regeneration within the nodes 10, 12, and the transmission system must therefore be capable of suitably low error rates for transmission over the span between nodes. This span may be thousands of kilometers in a long haul network. Although no regeneration (namely opto-electric and electro-optic conversion) takes place between the nodes, optical amplification is typically required at intermediate amplifier sites 16.

Furthermore, the traffic transmitted from one node, for example node 10, may not all be destined for the other node 12, and instead there may be intermediate optical add/drop sites 18 as shown in FIG. 1. This add/drop site may be considered as a receiver site, and a receiver 19 is shown schematically in FIG. 1, as well as a transmitter 20 for providing add traffic. These sites may allow for the dropping of a number of the WDM channels to provide local service of low traffic volume. As a result, the traffic transmitted from node 10 may include some traffic which must survive transmission over the full fiber length to the other node 12, whereas other traffic on other channels will have shorter reach. A more robust transmission system is therefore required for some traffic than for other traffic. If this robust transmission system is used for the short reach data, there will be an "excess" of signal to noise ratio.

The invention provides a system which enables this excess signal to noise ratio to be traded for increased transmission capacity, so that more optimum capacity can be achieved for the different path characteristics. This is achieved using different modulation techniques/parameters using a common receiver architecture in the different receiver locations.

The invention can be applied in many different ways, and one implementation will be described with the aid of FIG. 2, which shows the conventional constellation pattern for 16-QAM (Quadrature Amplitude Modulation).

Figure 2:
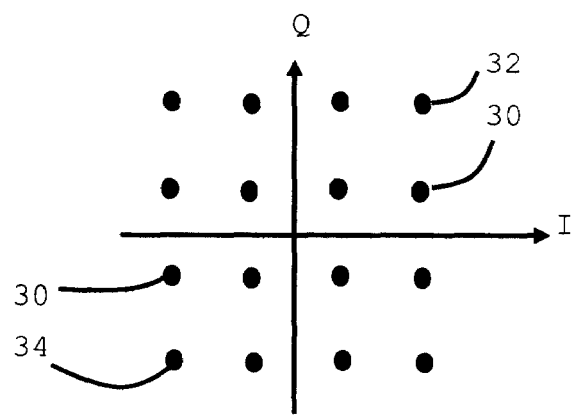
FIG. 2 shows the constellation pattern for 16-QAM.

In this modulation technique, the amplitude and phase of a carrier signal can be modulated so that each transmitted symbol occupies one of the constellation points 30 in the pattern of FIG. 2. The 16 point pattern enables a 4 bit symbol to be encoded by each transmission, so that the bit rate is four times the symbol rate. For example, a symbol rate of 2.5 Gbaud/s gives a bit rate of 10 Gbits/s. The closer the constellation points, the less robust the transmission system is to errors, and the benefit of the high bit rate (and therefore transmission capacity) may only be available to short reach links.

A more appropriate modulation system for long reach transmissions will be a binary modulation scheme instead of the multi-level modulation scheme. The invention provides a system by which the same transmission and reception hardware can be configured to operate using different modulation schemes. For example, using only two constellation points 32, 34 within the pattern, the transmitter can provide binary phase shift keying modulation. For a symbol rate of 2.5 Gbaud/s. this modulation scheme will give a bit rate of 2.5 Gbit/s, but the increased spacing between the two points 32,34 increases the transmission robustness.

Broadly, the invention provides an optical communications system using multiple level phase and/or amplitude modulation, with the transmitter being adaptable to provide modulation for different signals using different selections of the multiple levels. The receivers then have a demodulation system enabling demodulation from the multiple level phase and/or amplitude modulation, and being adaptable to provide demodulation of signals modulated using the different selections of the multiple levels.

The multi-level demodulation capability of the receiver is used even when binary modulation is carried out. The "spare" points in the QAM constellation are effectively used as soft decision threshold points, which can then be supplied to a soft-decision aware FEC algorithm.

The concept of soft decision thresholds will be well known to those skilled in the art. One commonly used error-correction system is convolutional error-correcting coding, with Viterbi decoders used for the decoding operation. The error-correcting code increases the required number of bits to be transmitted.

Convolutional coding can be used for Hard and Soft decision encoding/decoding. Soft decision decoding involves assigning a level of confidence to any symbol detection. The capability of the receiver in the system of the invention to measure the received signal strength at additional constellation points to those used for the modulation of the signal enables this soft decision information to be derived The application of forward error correction (FEC) data is widely used, to make the signal more tolerant to noise (after FEC decoding) so enabling the power level to be reduced. In the system of the invention, the signal, together with additional FEC data, is transmitted over a sub-set of the constellation points, for example the two most widely separated constellation points, and the receiver is configured to receive only on those two points. However, the receiver accepts symbols on the other points as probabilistic data in addition to the normal FEC data.

Figure 3:
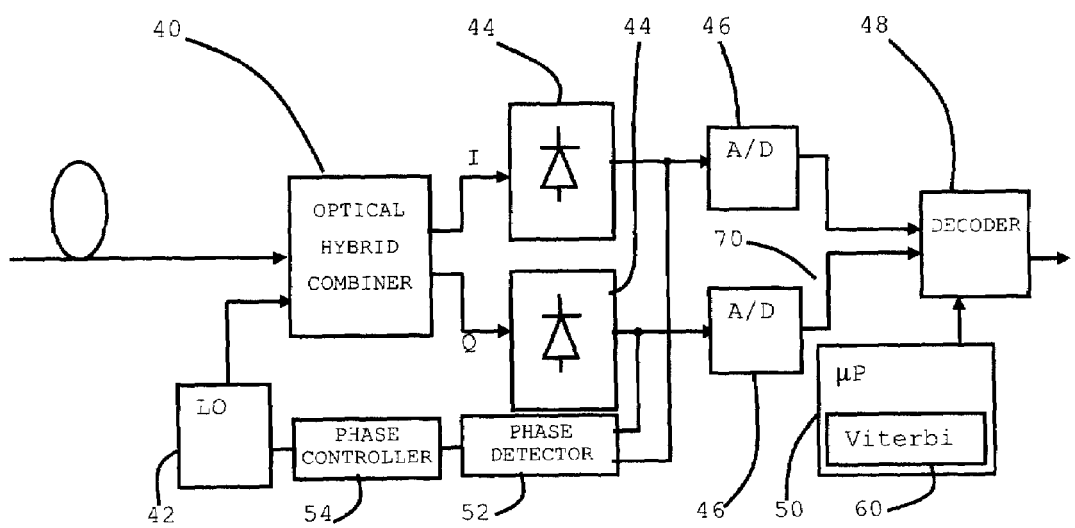
FIG. 3 shows a receiver of the invention.

FIG. 3 shows schematically one example of receiver which can be used at the receiver sites. For each receiver site, the same hardware can be employed, but the control of the hardware can be implemented in different levels. Thus, the same line cards can be used within the communications system, thereby reducing inventory. Different functionality can then be obtained through software upgrades.

As shown in FIG. 3, the receiver uses an optical hybrid combiner 40 to derive, from the input optical signal, the in-phase (I) and quadrature (Q) components of the signal. This requires coherent detection, and the timing is governed by a local oscillator 42.

Signal amplitude of the I and Q components is obtained by opto-electric conversion with photodiode-based receivers 44, the outputs from which are digitised by A/D converters 46. These A/D converters must operate at the signalling rate of the communications system. This is 2.5 Gbaud/s in the example above, although the signalling rate may be 10 Gbaud/s. The digitised information is provided to a decoder 48 which is under the control of a software-controlled processor 50.

The local oscillator 42 is controlled by a feedback system to track the phase of the input, and this is carried out using a phase detector 52 for carrier recovery and a phase controller 54 which controls the local oscillator 42.

As mentioned above, the receiver of FIG. 3 can be configured to interpret differently encoded signals. This involves controlling the decoder 48 in different ways, and different levels of software may be provided for the processor 50 to enable different functions to be carried out. As shown in FIG. 3, the controller may include a Viterbi decoding algorithm 60, although other soft decision FEC decoding schemes may also be implemented.

It is well known that some non-linear optical effect are data rate dependent, for example the spreading of optical pulses as a result of chromatic dispersion. The closer pulses are together, the more likely chromatic dispersion is to lead to inter-symbol interference. Therefore, the transmission of multiple lower bit rate channels may be attractive if channel cross talk can be avoided despite the closer channel separation. In some cases, the standard channel separation defined by the ITU grid exceeds that now required to avoid this cross talk.

One possible approach is therefore to transmit channels on multiple sub-carrier frequencies, thereby providing increased bit rate transmission, whilst using the same single transmitter and receiver hardware. This is attractive when single-carrier transmission is not sufficient for the required data rate.

There are various ways to do this. In an implementation with DSP control, the use of Fast Fourier Transforms (FFTs) is attractive. With sufficiently fast A/D converters, a Fourier transform allows multiple sub-carriers to be separated by frequency, and these can be received using inverse Fourier transforms (FFTs) separately, after analogue to digital conversion in the receiver. In FIG. 3, inverse Fourier Transformation units are provided at the outputs of the A/D converters in the processor 50. These "units" are in practice software features within the DSP. This requires the A/D converters to operate at speeds which are the required multiple of the individual sub-carrier channel signalling rate.

If the sub-carriers are spaced by the inverse of the symbol rate, the sub-carriers will be orthogonal, and can thereby be cleanly separated from each other by the FFT operation in the receiver.

Sub-carrier modulation can also, however, be implemented electrically, and then involves electrically modulating N separate sets of I/Q data onto different carrier frequencies, which are then summed. The electrical signal is then amplified and applied to an optical modulator. Although deriving from a single laser within the optical modulator, the resulting optical signal has effectively N separate wavelengths on its output. A pre-processing module will be placed between the final electrical amplifier and the modulator in order to offer differential-drive, chirp control, phase modulation, etc.

In the example above, a discrete and uniform constellation pattern has been described. However, the transmitter/receiver can in fact modulate at any selected point within the constellation space. Therefore, the constellation pattern may be biased toward the I or Q axis which is least susceptible to noise, for example moving towards a bow tie constellation pattern. For example, if there is more phase noise, the pattern could be biased towards the amplitude axis.

The constellation space can define a continuous space, with high resolution digitised constellation position information obtained at the receiver.

The receiver can also carry out additional functions, such as quality factor (Q) measurement, or impulse response testing of the channels.

As described above, an FFT system can be implemented to enable sub-carrier modulation. This opens up additional possibilities. In particular, this enables data to be available in the frequency domain, so that pre-distortion of the power versus frequency spectrum can be carried out.

Figure 4:
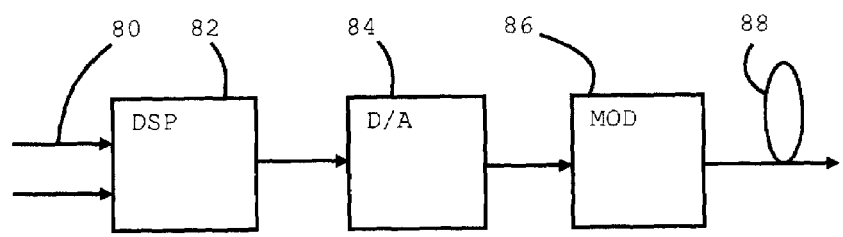
FIG. 4 shows a transmitter of the invention.

FIG. 4 shows schematically the basic elements of a an embodiment of transmitter design suitable for the invention. The channel data 80 in digital form is provided to a digital signal processor (DSP) 82, which includes various algorithms for pre-processing of the signals.

For example, the DSP 82 may include Fourier transformation unit for sub-carrier modulation, as well as algorithms for pre-distortion compensation. Because the data to be transmitted down each sub-carrier channel is known by the transmitter, it is possible to correct in advance for deterministic effects dependent on the different channel data, such as cross phase modulation, to provide echo cancellation and/or to compensate for four wave mixing.

The provision of Fourier transform capability in the DSP enables time domain and frequency domain processing to be carried out.

Digital to analogue converters 84 are provided to prepare the analogue signals for modulating the optical carriers in the modulation unit 86. For QAM modulation, two phase modulators, for example Mach-Zehnder modulators, are provided for modulating components of the local oscillator which are delayed by 90 degrees relative to each other. This provides the I and Q modulation components, in known manner.

Direct (non-coherent) modulation schemes are also possible.

The light output 88 from the modulation unit 86 can have any modulation format, as defined by the DSP 82 and the capability of the modulation unit 86. These capabilities may be implemented as different levels of software to accompany standardized hardware.

As mentioned above, the DSP can provide pre-processing to compensate for Four Wave Mixing. Generally, the Four Wave Mixing effect limits how closely channels can be grouped in the frequency spectrum. The ability to provide pre-distortion for compensating for FWM enables the channel separation to be reduced significantly, which thereby enables the overall data rate to be increased, or enables the data rate on each sub-carrier channel to be reduced further (or a combination of these). This then enables reduction in the effect of chromatic dispersion, and can in principle avoid the need to carry out chromatic dispersion compensation if the individual sub-channel data rate is sufficiently low.

The required pre-distortion to compensation for FWM and cross phase modulation can be determined by performing suitable impulse response testing, for example on multiple sub-carrier channels simultaneously.

The compensation of Four Wave Mixing can instead (or additionally) be carried out by the receiver DSP, as it has also has available to it the channel information for a number of channels. In each case, the DSP must operate at a sufficient speed to process the multiple channels in real time to provide the required compensation.

As the speed of DSP circuits and D/A and A/D converters increases, the communication data rate at which the system of the invention can be implemented will also increase.

The system can further be adapted to provide polarization dependent modulation in order to reduce the required signalling rate. Such approaches will be known to those skilled in the art.

The system of the invention can be configured to auto-discover the optimum transmission rate. This requires a back-channel from the receiver to the transmitter—for example the opposite direction link, the optical service channel or a connection via the network management layer. The receiver then signals to the transmitter whether reception is with an acceptable error rate. This error rate may be evaluated using a Q measurement in the receiver, or for example using the number of errors corrected using the FEC algorithm.

This feedback would enable the transmitter to transmit with the most robust modulation scheme and then increase the bit rate until the received error rate passes the acceptability threshold, and then back off to the last acceptably received data rate. Other feedback implementations would of course be possible.

The channel bit rate could in this way be made to vary in time to suit changing line conditions. The equipment ageing margin built in to systems could therefore be utilised for transmission to give higher initial bit rates.

There are numerous different implementations of the invention to the specific choices of modulation schemes and FEC schemes described above, and these will be apparent to those skilled in the art.

We claim:

1. An optical fiber communications system comprising at least one transmitter site for transmitting optical signals, at least one receiver site for receiving optical signals from the at least one transmitter site, and at least two different optical fiber paths each arranged between the at least one transmitter site and the at least one receiver site,
    wherein each transmitter site comprises a transmitter having a modulation system enabling modulation using QAM defined by 16 constellation points, the transmitter being adaptable to provide modulation for different signals for respective ones of the paths using different selections of the 16 constellation points including a first selection of 2 of the points, a second selection of 4 of the points, a third selection of 8 of the points and a fourth selection of all 16 of the points, wherein the transmitter is configured to select the different selections for the respective signals in dependence on relative noise characteristics of the respective paths, and
    wherein each receiver site comprises a receiver having a demodulation system enabling demodulation from the QAM defined by 16 constellation points, and being adaptable to provide demodulation of different signals which have been modulated using the different selections of the 16 constellation points, including demodulation of the signals received from transmitter sites on respective ones of the paths.

2. A system as claimed in claim 1 wherein the first selection of 2 points is used for binary differential phase shift keying.

3. A system as claimed in claim 1, wherein the receiver comprises demodulation hardware and a controller for controlling the hardware and operable using software, wherein the receiver has identical hardware which is controllable by software.

4. A system as claimed in claim 1, wherein the different combinations of the multiple levels provide different bit rates.

5. A system as claimed in claim 1, wherein the transmitter has capability for applying forward error correction coding.

6. A system as claimed in claim 1, wherein the receiver comprises an I and Q decoder and digitizer circuitry for multi-level decoding of the signal.

7. A system as claimed in claim 1, wherein the transmitter is capable of transmitting signals on a plurality of sub-carrier frequencies.

8. A system as claimed in claim 7, wherein the receiver is capable of reconstructing data from multiple sub-carrier frequency carriers.

9. A system as claimed in claim 7, wherein the transmitter comprises a pre-distortion unit.

10. A system as claimed in claim 9, wherein the pre-distortion unit is capable of modifying the power versus frequency characteristics of the signal to be transmitted.

11. A system as claimed in claim 9, wherein the pre-distortion unit is capable of providing compensation for cross phase modulation.

12. A system as claimed in claim 9, wherein the pre-distortion unit is capable of providing compensation for four wave mixing.

13. A system as claimed in claim 9, wherein the pre-distortion unit is capable of providing compensation for chromatic dispersion.

14. A system as claimed in claim 1, comprising at least two receiver sites, wherein the transmitter is for sending multiple wavelength division multiplex signals on different channel frequencies, with different channels being transmitted to the different receiver sites.

15. A transmitter for use in an optical fiber communications system, comprising a modulation system enabling modulation using CAM defined by 16 constellation points, the transmitter being adaptable to provide modulation for different signals for transmission over respective different optical fiber paths using different selections of the 16 constellation points including a first selection of 2 of the points, a second selection of 4 of the points, a third selection of 8 of the points and a fourth selection of all 16 of the points, wherein the transmitter is configured to select the different selections of the multiple levels for the respective signals in dependence on relative noise characteristics of the respective paths.

16. A transmitter as claimed in claim 15, wherein the first selection of two points is used for binary differential phase shift keying.

17. A method of transmitting optical data from a transmitter site to at least two receiver sites, the method comprising:
    controlling a modulation unit in the transmitter site to modulate a first signal carrier, the modulation unit enabling modulation using QAM defined by 16 constellation points and being adaptable to provide modulation for different signals using different selections of the 16 constellation points including a first selection of 2 of the points, a second selection of 4 of the points, a third selection of 8 of the points and a fourth selection of all 16 of the points, the modulation unit using the first, second, third or fourth selection for modulating the first signal carrier, and transmitting the modulated signal to one of the receiver sites over a first optical fiber path; and
    controlling the modulation unit in the transmitter site to modulate a second signal carrier using a different one of the first, second, third and fourth selections to that used for modulating the first signal carrier, and transmitting the modulated signal to the other of the receiver sites over a second optical fiber path,
    wherein the different selections used to modulate the respective signal carriers are selected in dependence on relative noise characteristics of the respective paths.

18. A method as claimed in claim 17, further comprising applying forward error correction coding to one or both of the signals for the at least two receiver sites.

19. A method as claimed in claim 17, further comprising applying pre-distortion to one or both of the signals for the at least two receiver sites.

20. A method as claimed in claim 19, wherein the pre-distortion modifies the power versus frequency characteristics of the signal to be transmitted.

21. A method as claimed in claim 19, wherein the pre-distortion provides compensation for cross phase modulation.

22. A method as claimed in claim 19, wherein the pre-distortion provides compensation for four wave mixing.

23. A method as claimed in claim 19, wherein the pre-distortion provides compensation for chromatic dispersion.

24. A computer readable medium comprising computer program code which is configured to cause a processor to control an optical transmitter having a modulator, the modulator enabling modulation using QAM defined by 16 constellation points and being adaptable to provide modulation for different signals using different selections of the 16 constellation points including a first selection of 2 of the points, a second selection of 4 of the points, a third selection of 8 of the points and a fourth selection of all 16 of the points, the computer program code being configured to cause the processor to control the optical transmitter to:

control the modulator to modulate a first signal carrier using the first, second, third or fourth selection of the points, and transmit the modulated signal to a first destination over a first optical fiber path; and control the modulator to modulate a second signal carrier using a different one of the first, second, third and fourth selections of the points to that used for modulating the first signal carrier, and transmit the modulated signal to a second destination over a second optical fiber path, wherein the different selections used to modulate the respective signal carriers are selected in dependence on relative noise characteristics of the respective paths.

25. A computer readable medium as claimed in claim 24, further comprising code for applying forward error correction coding to one or both of the signals for the two destinations.

26. A computer readable medium as claimed in claim 24, further comprising code for applying pre-distortion to one or both of the signals for the two destinations.

27. A computer readable medium as claimed in claim 26, wherein the pre-distortion modifies the power versus frequency characteristics of the signal to be transmitted.

28. A computer readable medium as claimed in claim 26, wherein the pre-distortion provides compensation for cross phase modulation.

29. A computer readable medium as claimed in claim 26, wherein the pre-distortion provides compensation for four wave mixing.

30. A computer readable medium as claimed in claim 26, wherein the pre-distortion provides compensation for chromatic dispersion.

* * * * *